United States Patent
Ream et al.

(10) Patent No.: US 6,549,225 B2
(45) Date of Patent: Apr. 15, 2003

(54) METHOD OF MARGIN ALIGNMENT AND PLANE-TO-PLANE REGISTRATION IN A TANDEM COLOR ELECTROPHOTOGRAPHIC MACHINE

(75) Inventors: Gregory Lawrence Ream, Lexington, KY (US); David Anthony Schneider, Lexington, KY (US); Earl Dawson Ward, II, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/795,768

(22) Filed: Feb. 28, 2001

(65) Prior Publication Data

US 2002/0118268 A1 Aug. 29, 2002

(51) Int. Cl.⁷ .............................................. B41J 2/435
(52) U.S. Cl. ....................................... 347/234; 347/248
(58) Field of Search ................................ 347/115, 116, 347/234, 235, 248, 250, 129; 358/1.1, 1.2, 481

(56) References Cited

U.S. PATENT DOCUMENTS

| | | | |
|---|---|---|---|
| 4,831,420 A | 5/1989 | Walsh et al. ................. 399/16 |
| 4,903,067 A * | 2/1990 | Murayama et al. ......... 347/129 |
| 4,920,430 A * | 4/1990 | Isono et al. ................. 358/481 |
| 5,093,674 A | 3/1992 | Storlie ......................... 382/238 |
| 5,099,260 A | 3/1992 | Sato et al. ................... 347/166 |
| 5,128,858 A * | 7/1992 | Kitabata ...................... 358/1.1 |
| 5,278,587 A | 1/1994 | Strauch et al. ............... 347/118 |
| 5,287,162 A | 2/1994 | de Jong et al. .............. 399/49 |
| 5,291,223 A | 3/1994 | Ogane et al. ................ 347/116 |
| 5,303,064 A | 4/1994 | Johnson et al. ............. 358/406 |
| 5,361,329 A * | 11/1994 | Morita et al. ................ 358/1.2 |
| 5,365,074 A | 11/1994 | Genovese ............... 250/559.29 |
| 5,373,355 A | 12/1994 | Ando et al. .................. 399/301 |
| 5,384,592 A | 1/1995 | Wong .......................... 347/116 |
| 5,436,647 A * | 7/1995 | Kasahara .................... 347/115 |
| 5,452,112 A | 9/1995 | Wan et al. ................... 358/504 |
| 5,457,518 A | 10/1995 | Ashikaga et al. ............. 399/28 |
| 5,508,826 A | 4/1996 | Lloyd et al. ................. 358/501 |
| 5,510,885 A | 4/1996 | Mori et al. ................... 399/28 |
| 5,523,823 A | 6/1996 | Ashikaga ..................... 399/28 |
| 5,550,625 A | 8/1996 | Takamatsu et al. ......... 399/301 |
| 5,555,084 A | 9/1996 | Vetromile et al. ............ 399/16 |
| 5,576,753 A | 11/1996 | Kataoka et al. ............. 347/248 |
| 5,587,771 A | 12/1996 | Mori et al. ................... 399/72 |
| 5,748,221 A | 5/1998 | Castelli et al. .............. 347/232 |
| 5,751,462 A | 5/1998 | Shiraishi et al. ............ 359/204 |
| 5,774,249 A | 6/1998 | Shiraishi et al. ............ 359/205 |
| 5,784,679 A | 7/1998 | Schlueter, Jr. et al. ...... 399/335 |
| 5,819,140 A | 10/1998 | Iseki et al. ................... 399/165 |
| 5,838,465 A | 11/1998 | Satou et al. ................. 358/520 |
| 5,877,798 A | 3/1999 | Clarke et al. ................ 347/250 |
| 5,899,609 A | 5/1999 | Wang .......................... 399/281 |
| 5,909,235 A | 6/1999 | Folkins ....................... 347/240 |
| 5,930,466 A | 7/1999 | Rademacher ............... 358/1.15 |
| 5,966,159 A | 10/1999 | Ogasawara ................. 347/133 |
| 5,982,408 A | 11/1999 | Overall et al. .............. 347/250 |

\* cited by examiner

*Primary Examiner*—Hai Pham
(74) *Attorney, Agent, or Firm*—John A. Brady; John J. McArdle; Ronald K. Aust

(57) ABSTRACT

A method of setting a plurality of margins in an electrophotographic machine includes setting a top margin for a reference color black by establishing a first time delay between a vertical synchronization signal and a first line. A right margin or a left margin for the reference color black is set by establishing a second time delay between a horizontal synchronization signal and a start of printing. The other of the right margin and the left margin is set by adjusting a scan speed of a laser beam across a photoconductive element and adjusting a process speed in the cross-scan direction including the speed of the photoconductive element, image accumulation member, and print medium. A bottom margin is set by adjusting the process speed. The other three color planes, cyan, magenta and yellow are then registered or aligned to the reference color plane, black.

11 Claims, 7 Drawing Sheets

| CE Offset | 600 LMOBCOUNT | 600 LMODCOUNT | 600 Comp LMOBCOUNT | 600 Comp LMODCOUNT | 1200 LMOBCOUNT | 1200 LMODCOUNT | 1200 Comp LMOBCOUNT | 1200 Comp LMODCOUNT |
|---|---|---|---|---|---|---|---|---|
| -12 | -138 | -150 | -140 | -153 | -276 | -301 | -284 | -309 |
| -11 | -127 | -138 | -129 | -140 | -253 | -276 | -260 | -284 |
| -10 | -115 | -126 | -117 | -128 | -231 | -251 | -237 | -258 |
| -9 | -104 | -113 | -106 | -115 | -208 | -226 | -214 | -233 |
| -8 | -92 | -101 | -94 | -102 | -185 | -201 | -190 | -207 |
| -7 | -81 | -88 | -82 | -90 | -162 | -176 | -167 | -182 |
| -6 | -69 | -76 | -71 | -77 | -139 | -151 | -143 | -156 |
| -5 | -58 | -63 | -59 | -64 | -116 | -126 | -120 | -131 |
| -4 | -46 | -50 | -47 | -51 | -93 | -101 | -96 | -105 |
| -3 | -35 | -38 | -35 | -39 | -70 | -76 | -73 | -79 |
| -2 | -23 | -25 | -24 | -26 | -46 | -51 | -49 | -53 |
| -1 | -12 | -13 | -12 | -13 | -23 | -25 | -25 | -28 |
| 1 | 12 | 13 | 12 | 13 | 23 | 25 | 22 | 24 |
| 2 | 23 | 25 | 24 | 26 | 46 | 51 | 46 | 50 |
| 3 | 35 | 38 | 35 | 39 | 70 | 76 | 69 | 76 |
| 4 | 46 | 51 | 47 | 51 | 93 | 101 | 93 | 101 |
| 5 | 58 | 63 | 59 | 64 | 116 | 126 | 117 | 127 |
| 6 | 70 | 76 | 71 | 77 | 139 | 152 | 140 | 153 |
| 7 | 81 | 88 | 83 | 90 | 162 | 177 | 164 | 179 |
| 8 | 93 | 101 | 94 | 103 | 186 | 202 | 188 | 205 |
| 9 | 104 | 114 | 106 | 116 | 209 | 228 | 212 | 230 |
| 10 | 116 | 126 | 118 | 129 | 232 | 253 | 235 | 256 |
| 11 | 128 | 139 | 130 | 141 | 255 | 278 | 259 | 282 |
| 12 | 139 | 152 | 141 | 154 | 278 | 303 | 283 | 308 |

Fig. 6

METHOD OF MARGIN ALIGNMENT AND PLANE-TO-PLANE REGISTRATION IN A TANDEM COLOR ELECTROPHOTOGRAPHIC MACHINE

BACKGROUND OF THE INVENTION

1. Field of the Invention

The present invention relates to a tandem color electrophotographic machine, and, more particularly, to margin alignment and plane-to-plane registration in a tandem color electrophotographic machine.

2. Description of the Related Art

Tandem color printing enables color electrophotographic printing to be performed by a printer at the same speed as black-and-white (mono color) electrophotographic printing. Such a tandem process utilizes four separate imaging devices to simultaneously create four separate latent images on four different photoconductive surfaces. Thus, all four colors can be imaged, developed, and transferred to the desired media at the same speed as a single color could be printed. Single color printers all implement techniques to align the top of the page, left margin, line length, and page length. In a tandem configuration, an additional difficult problem arises in registering each color image plane accurately relative to all the other color image planes. Manufacturers have been hesitant to produce tandem color laser printers because of the difficulty in maintaining alignment and plane-to-plane registration due to manufacturing tolerances.

What is needed in the art is a method of aligning the registration of all color planes in both the process direction (media direction of travel) and the scan direction (cross process direction).

SUMMARY OF THE INVENTION

The present invention provides a method of setting the margins and plane-to-plane registration at factory calibration and in field adjustments. The present invention utilizes print element (PEL) slice insertion, mirror motor synchronization, and additional techniques to achieve the desired initial registration.

The invention comprises, in one form thereof, a method of setting a plurality of margins in an electrophotographic machine. A top margin for a reference color black is set by establishing a first time delay between a vertical synchronization signal and a first line. A right margin or a left margin for the reference color black is set by establishing a second time delay between a horizontal synchronization signal and a start of printing. The other of the right margin and the left margin is set by adjusting a scan speed of a laser beam across a photoconductive element and adjusting a process speed in the cross-scan direction including speed of the photoconductive element, image accumulation member, and print medium. A bottom margin for the reference color black is set by adjusting the process speed. The other three colors, cyan, magenta, and yellow, are then registered to the reference color black.

An advantage of the present invention is that margins and plane-to-plane registration can be set at factory calibration and in field adjustments in order to compensate for manufacturing tolerances.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6 is a lookup table for motor offsets;

FIG. 8 is a timing diagram of vertical synchronization signals which are used in conjunction with the method of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
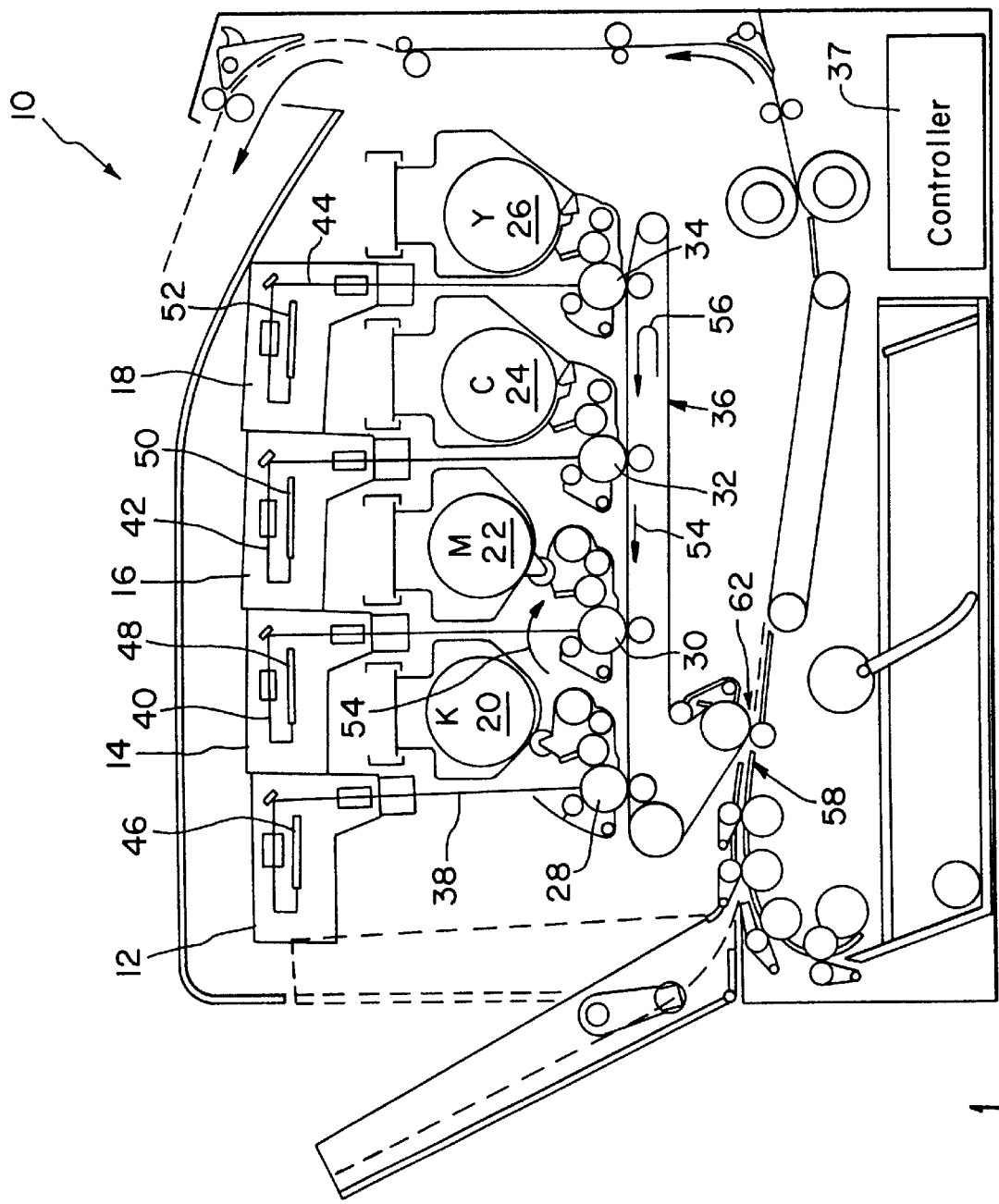
FIG. 1 is a schematic, side view of one embodiment of a laser printer in which the method of the present invention may be used.

Referring now to the drawings and, more particularly, to FIG. 1, there is shown one embodiment of a multicolor laser printer 10 in which the method of the present invention may be used. Printer 10 includes laser print heads 12, 14, 16, 18, a black toner cartridge 20, a magenta toner cartridge 22, a cyan toner cartridge 24, a yellow toner cartridge 26, photoconductive drums 28, 30, 32, 34, an intermediate transfer member belt 36 and a controller 37. The controller is a combination of Application Specific Integrated Circuits (ASIC's), microprocessors, and firmware suited to the tasks described.

Each of laser print heads 12, 14, 16 and 18 projects a respective laser beam 38, 40, 42, 44 off of a respective one of polygon mirrors 46, 48, 50 and 52. As each of polygon mirrors 46, 48, 50 and 52 rotates, it scans a respective one of reflected laser beams 38, 40, 42 and 44 in a scan direction, perpendicular to the plane of FIG. 1, across a respective one of photoconductive drums 28, 30, 32 and 34. Each of photoconductive drums 28, 30, 32 and 34 is negatively charged to approximately −1000 volts and is subsequently discharged to a level of approximately −300 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process direction indicated by direction arrow 54. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged and is transported upon the surface of a developer roll biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −300 volts by the laser beams. As belt 36 rotates in the direction indicated by arrow 56, the toner from each of drums 28, 30, 32 and 34 is transferred to the outside surface of belt 36. As a print medium, such as paper, travels along path 58, the toner is transferred to the surface of the print medium in nip 62.

In one embodiment of the method of the present invention, printer registration adjustments are made at the end of the manufacturing line to register the black plane to the paper, and set the plane-to-plane registration of the cyan, magenta, and yellow planes (CMY) to the black (K) plane. The alignment process can be performed with the engine in 600 dots per inch (dpi) mode. Targets are placed on the top, bottom, left hand side and right hand side of the page (FIG. 2) which can used by the manufacturing line person when performing the calibration of the machine. The individual adjustments that are made are described below.

Printheads 12, 14, 16 and 18 are mechanically aligned and adjusted for skew using a calibration fixture prior to making any margin adjustments. Also, the initial setting for the right margin can be downloaded to printer 10 during the same process used to align the printheads 12, 14, 16, 18 to eliminate skew.

The skew for all four printheads is adjusted first mechanically using a calibration system that includes an alignment fixture with CCD cameras and LVDT sensors connected through a computer system. Second, further fine skew adjustment for the magenta, cyan and yellow printheads is accomplished digitally using black as the reference. The fine skew adjustment has a range of +/−0.2117 mm in +/−10 increments of one printing element (PEL) each, with each PEL having a resolution of 1200 dots per inch (dpi). After completing the coarse mechanical skew adjustment, the calibration system then measures the residual skew, calculates the desired adjustments for magenta, cyan, and yellow planes, and downloads the values to the machine where they are stored in NVRAM.

Figure 2:
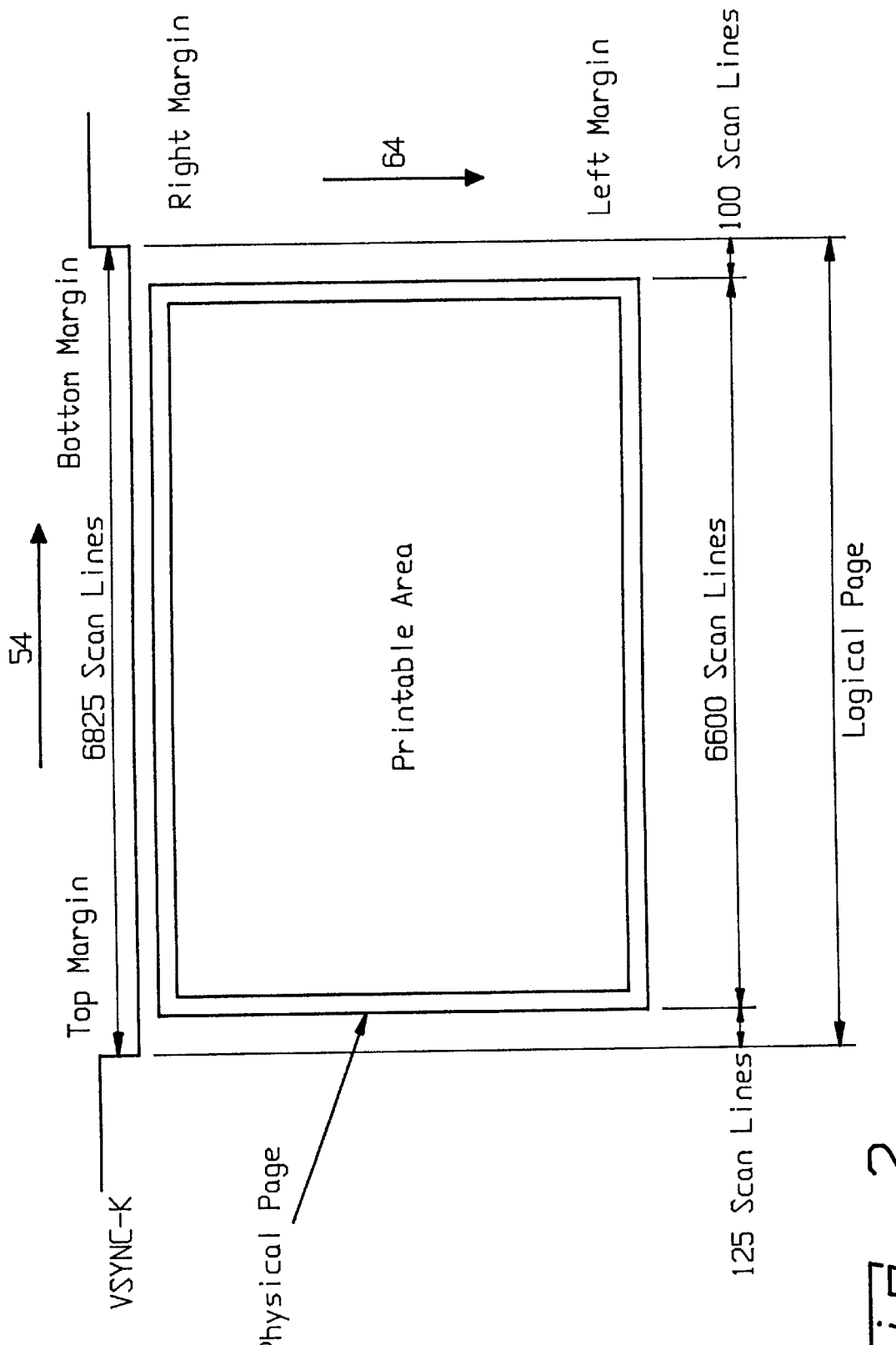
FIG. 2 is an overhead view of a sheet of print medium which may be used in conjunction with the method of the present invention.

The printable area is aligned on the page, as illustrated in FIG. 2 using the black plane as the reference.

The embodiment of the present invention described herein includes first setting the margins for the black plane and then aligning the color planes to black. However, it is to be understood that the sequence is not limited to this order. Additionally, where operations are described as being performed manually by an operator, it is to be understood that the same operations can be performed in an automated fashion using a scanner and settings communicated electronically to the printer controller. In the illustrated embodiment, the image is scanned from the right margin to the left margin.

The margins can be aligned in the following order. First, in order to align the black (K) top margin, the raster image processor (RIP) controller in controller 37 sets the delay from the vertical synchronization signal (Vsync) to the first line that is printed on the page. Second, to align the K right margin, the raster image processor (RIP) controller sets the time delay from the K horizontal synchronization signal (Hsync). Third, to align the K left margin, the raster image processor (RIP) controller adjusts the speed of a motor driving polygon mirror 46, and an engine controller within controller 37 adjusts the process speed of the page in process direction 54. Fourth, the engine controller also adjusts the process speed to align the K bottom margin.

The black top margin is adjusted by changing the number of scan lines between the Vertical synchronization signal (Vsync) and the first writing line. The printed page consists of a logical page, physical page, and printable area. FIG. 2 illustrates the differences. The logical page describes the timing sequence for printing a page, the physical page is the outline of the print medium to which the actual image is transferred, and the printable area is defined as the printable area on the page.

The logical page has a total of 6825 scan lines for a 279.4 mm (11 inch) page. This logical page is separated into a beginning buffer with a possible range of 125 scan lines (from the Vsync signal going low to the top of the physical page), the 6600 scan lines for the physical page, and an ending buffer with a possible range of 100 scan lines at the end of the physical page. The top margin is adjusted by changing the size of the beginning and ending buffer (keeping the total of these two buffers equal to 6825−6600= 225 scan lines) so that the physical page starts earlier or later in time relative to Vsync. This causes the printable area to move towards the top or bottom of the page respectively. The black top margin adjustment has a range of +/−100 scan lines in +/−25 increments with each increment corresponding to four 600 dpi scans. Four scans at 600 dpi represents 0.0067 inch or 0.1693 mm in the process direction 54.

Figure 5:
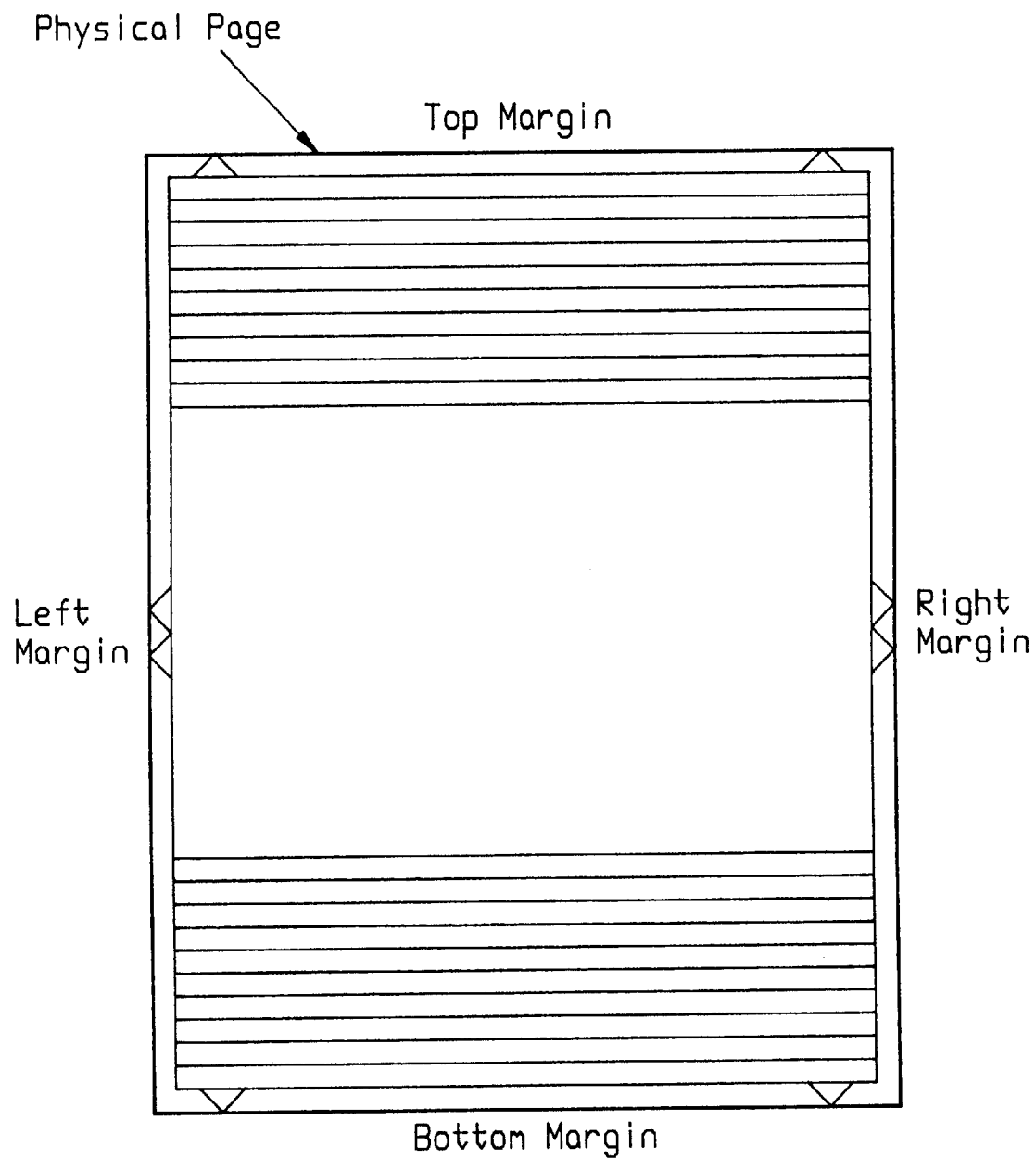
FIG. 5 is an overhead view of a calibration page with which the top, left, right and bottom margins can be adjusted.

The black top margin is set by first running a registration page (FIG. 5). The registration page has alignment marks that indicate the top, right, left, and bottom margins. In this mode, the printable area is equal to the physical page and the operator will adjust the settings until the alignment marks are at the edge of the page. If the operator determines that the top of the image is too far down the page, then the top margin value will be decreased to pull the top of the image back to the top of the physical page. Increasing the values will push the image toward the bottom of the page.

The panel range for the right margin is +/−12 increments. Each increment corresponds to four pels at a 600 dpi scan rate. Four pels at 600 dpi represents 0.0067 inch or 0.1693 mm in scan direction 64. Each pel is divided into a number of side-by-side slices (12 in this embodiment) extending in scan direction 64. The raster image processor (RIP) controls the right margin by adjusting the delay from the horizontal synchronization signal, Hsync, to the first PEL. The right margin delay (RMD), expressed in slices, is calculated by the following Equation (1):

$$RMD=RMO*4 \text{ pels/increment}*12 \text{ slices/pel}+RBL,$$

wherein RMO is a right margin offset expressed in increments, and RBL is a right baseline number of slices determined to be the nominal delay. The factory calibration station transfers the RMO value to the raster image processor (RIP) at setup time.

Figure 3:
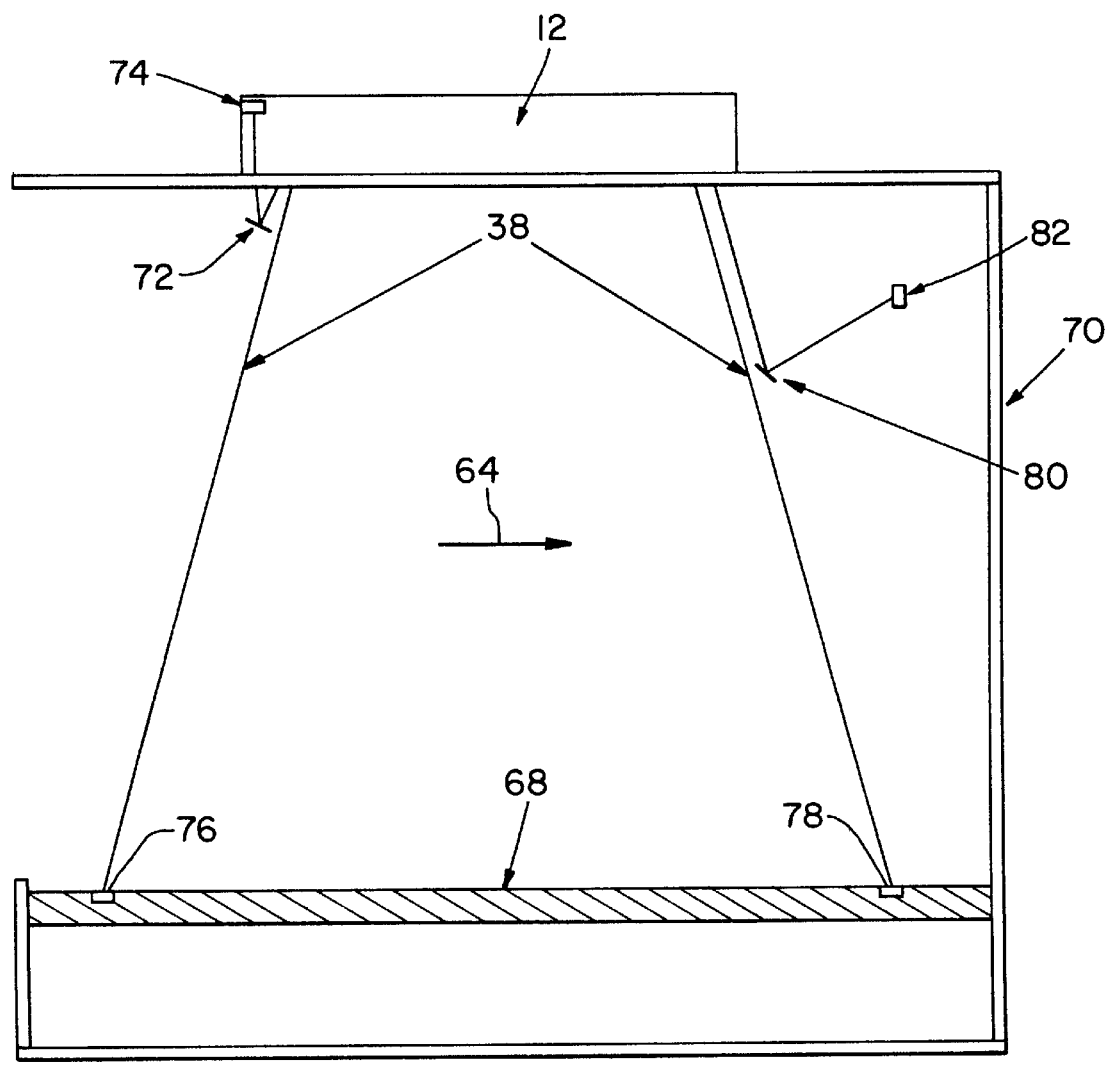
FIG. 3 is a schematic, side view of one embodiment of a factory calibration fixture which may be used in conjunction with the method of the present invention.

At the factory calibration station, a factory calibration fixture 68 (FIG. 3) is installed in printer 10 at the same location as the photoconductor drum. More particularly, calibration gage 68 is inserted into printer frame 70 in the place of photoconductive drum 28.

Laser printhead 12 produces a scanning laser beam 38 that reflects off of a folding mirror 72 onto an Hsync sensor 74. As printhead 12 scans laser beam 38 in scan direction 64, two sensors 76, 78 in the form of charge coupled device (CCD) cameras sense a spot of laser beam 38 as laser beam 38 travels across the active areas of cameras 76, 78. The calibration system then calculates the center of the laser spot to determine where the spot is located as referenced to fixture 68 relative to frame 70. The printer controller starts by turning on from PEL one through PEL 5100 with some nominal value loaded into the right margin delay (RMD) register (the printer scans from right margin to left margin). The printer controller 37 communicates to the calibration system for feedback as to the location of the first PEL on first camera 76. The controller 37 increments or decrements the right margin offset (RMO) value until the spot is at some predetermined location in the viewing area of first camera 76. The controller 37 then stores this as the right RMO value in NVRAM.

After determining the black right margin offset (RMO), the calibration system then looks for the end-of-scan PEL on the second camera 78 to set the left margin using the black plane as the reference. The left margin adjustment range is +/−48 PELs in +/−12 increments with each increment corresponding to four 600 dpi PELs. The black left margin is adjusted by changing the rotation speed of the printhead polygonal mirror motor with the RIP controller and using the engine to compensate the process speed proportionally. The nominal mirror motor speed is 19500 RPM. At the nominal mirror motor speed the time for the laser beam to complete one scan (facet-to-facet) is 384.6 microseconds. This yields a nominal laser beam velocity of 0.833 mm/microsecond. The time from the first to the end-of-scan PEL is constant for a given operating point and is calculated to be 215.9 mm/0.833 mm/microsecond or 259.2 microseconds. For the nominal scan time of 384.6 microseconds the process speed needs to be set so that 6600 scan lines can be written on an 279.4 mm (11 inch) page at 600 dpi. Therefore the nominal process speed is calculated using the following equation:

Page Length/(Number of scan lines per page*scan time)279.4/(6600*0.0003846)=110.067 mm/second.

If the calibration system determines that the black left margin needs to be smaller which will increase the line length, then the calibration system calculates the change in the left margin offset (LMO) to obtain the correct line length. The calibration system will then instruct the RIP controller to increment the left margin offset (LMO) by that value. The RIP controller will then increase the mirror motor speed accordingly. The increased mirror motor speed causes the scan time to decrease, which in turn increases the line length. The line length increases because the laser beam's velocity increases. The calibration system will then check the line length to determine if further adjustments are needed. This process is iterated until the last PEL is within tolerance for the left margin and the calibration system communicates to the RIP controller to save the LMO in NVRAM.

Since the scan time has changed, the process speed needs to be adjusted so that the image will travel 279.4 mm in the time required to scan 6600 scan lines. The RIP controller will communicate to the engine controller the value for the LMO so that the engine controller can compensate the process speed accordingly.

A reference clock for controlling the speed of the mirror motors and the process motors is generated by an ASIC in controller 37 using a counter and a system clock. A reference clock signal is generated by counting a predetermined number of system clock cycles and then toggling the output state of the reference clock after having counted the predetermined number of system clock cycles.

A mirror motor count (MMCOUNT) is defined as the number of cycles of the system clock that are to be counted before toggling the output of the reference clock that determines the speed of the mirror motor. A new mirror motor count (MMCOUNT) is calculated using a mirror motor count (BLMMCOUNT) at a baseline (nominal) line length and a baseline (nominal) operating speed, as well as a left margin offset (LMO) expressed in increments. In the preferred embodiment, it has been determined that incrementing the mirror motor count by four causes the line length to change by approximately four pels. Then, by using a lookup table, the print engine can change the process speed such that the number of scans between stations remains constant. The new mirror motor count (MMCOUNT) is given by the following Equation (2):

MMCOUNT=BLMMCOUNT+(LMO*4 counts/increment).

A brushless direct current motor drives intermediate transfer belt 36 and determines the speed of belt 36. A second reference clock generates a signal which determines the speed of the motor that drives belt 36. The cycling of the second reference clock is governed by a belt motor count (BMCOUNT) defined as the number of cycles of the system clock that are to be counted before toggling the output of the second reference clock. The belt motor count (BMCOUNT) is given by the following Equation (3):

BMCOUNT=BLBMCOUNT+LMOBCOUNT, wherein BLBMCOUNT represents a baseline belt motor count between the toggling of the state of the reference clock, and LMOBCOUNT represents a left margin offset belt motor count corresponding to the left margin offset LMO. The left margin offset belt motor count (LMOBCOUNT) is obtained from a lookup table which provides an offset value for every possible value of left margin offset LMO, i.e., +/−12.

Similarly, a second brushless direct current motor drives photoconductive drum 28 and determines the speed of photoconductive drum 28. A third reference clock generates a signal which determines the speed of the motor that drives photoconductive drum 28. The cycling of the third reference clock is governed by a drum motor count (DMCOUNT) defined as the number of cycles of the system clock that are to be counted before toggling the output of the third reference clock. The drum motor count (DMCOUNT) is given by the following Equation (4):

DMCOUNT=BLDMCOUNT+LMODCOUNT, wherein BLBDCOUNT represents a baseline drum motor count between the toggling of the state of its reference clock, and LMODCOUNT represents a left margin offset drum count corresponding to the left margin offset LMO. The count (LMODCOUNT) is obtained from a lookup table which provides a LMODCOUNT value for every possible value of left margin offset LMO, i.e., +/−12.

An example of the above-described calculations using actual numbers is now provided in order to facilitate understanding. Assume that the system clock operates at a frequency of 16 MHz and that a reference clock for driving the drum motor is to have a baseline frequency of 839.735 Hz. The baseline drum motor count (BLDMCOUNT) for one half the reference clock period can then be calculated as follows:

BLDMCOUNT=16 MHz/(839.735 Hz*2)=9527 counts.

Figure 4:
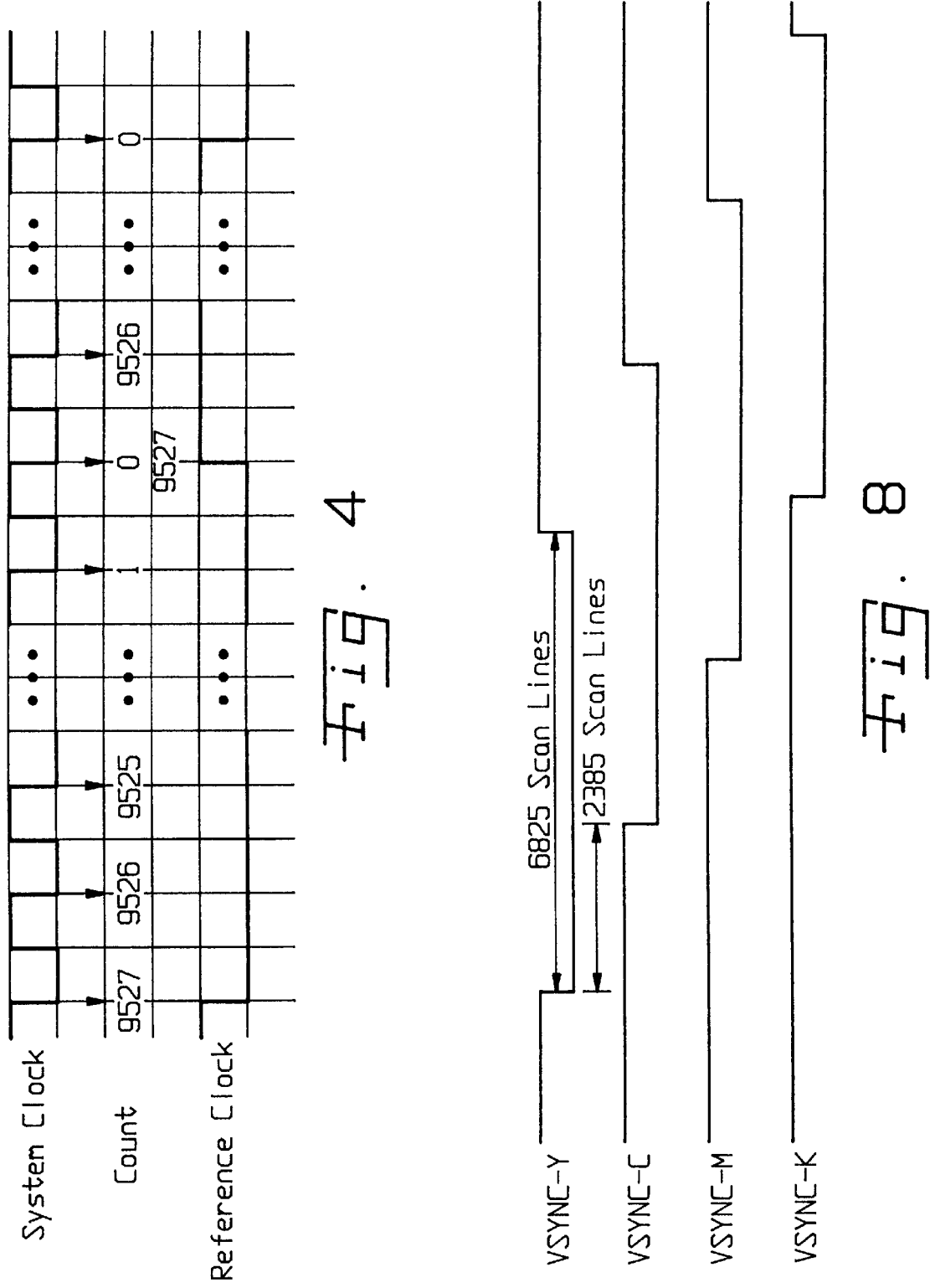
FIG. 4 is a plot of a system clock signal and a reference clock signal which are used in conjunction with the method of the present invention.

Thus, as shown in FIG. 4, the state of the drum motor reference clock changes after every 9527 complete cycles of the system clock.

Further assume the following additional nominal settings at a resolution of 600 dpi:

Right baseline value (RBL)=2835 slices;

Baseline mirror motor count (BLMMCOUNT)=5045 counts; and

Baseline belt motor count (BLBMCOUNT)=10179 counts.

Then, if the right margin offset (RMO) equals eight increments, and the left margin offset (LMO) equals ten increments, then the following values can be calculated:

Right margin delay (RMD)=8 increments*4 pels/increment*12 slices/pel+2835=3219 slices Mirror motor count (MMCOUNT)=5045+(4*10)=5085 counts Belt motor count (BMCOUNT)=10179+116=10295 counts Drum motor count (DMCOUNT)=9527+126=9653 counts The values 116 and 126 from the previous two equations represent the left margin offset belt count (LMOBCOUNT) and the left margin offset drum count (LMODCOUNT), respectively, and are obtained from the lookup table (FIG. 6) which relates the left margin offset belt count (LMOBCOUNT) and the left margin offset drum count (LMODCOUNT) to the left margin offset (LMO).

The panel range for the bottom margin is +/−25 increments. The fill range of adjustment causes approximately a +/−2.5% change in the speed of the paper along the path. Therefore, with a page length of 279.4 mm, each increment causes a 0.1% change in paper speed and an approximate 0.2794 mm shift in the bottom margin. This shift is accomplished by changing the process speed for the belt motor, the drum motor and the paper feed motor. Here, the paper feed motor speed is adjusted to feed the print media in accordance with a speed change of the image accumulator belt. The count of the reference clock is increased by 0.1% per increment for the drum motor and for the belt motor, as indicated by the following Equations (5) and (6):

BMCOUNT=BLBMCOUNT+LMOBCOUNT+ BMO*BLBMCOUNT*0.001

DMCOUNT=BLDMCOUNT+LMODCOUNT+ BMO*BLBMCOUNT*0.001, wherein BMO is a bottom margin offset expressed in increments. BMO is obtained from the registration page shown in FIG. 5. It is to be understood that it is Equations (5) and (6) that are actually used to calculate BMCOUNT and DMCOUNT because they include both the left and bottom adjustments. Equations (3) and (4) cannot be used for setting the bottom margin.

It has been determined that by using the above incremental values, the print engine can keep track of the number of scan lines between stations with a simple equation using only integer math, as shown in Equation (7) below. In order to maintain the plane-to-plane registration, it is imperative that the print engine know the number of scan lines between the color stations.

SL=BLSL+2*LMO, wherein SL is the spacing in scan lines between color stations, and BLSL is the baseline or nominal spacing in scan lines between color stations.

Correction of the plane-to plane registration includes the process of adjusting the three colors, CMY, to black. This can be performed partially with the calibration system and then completed by printing calibration patterns and measuring the difference between the planes. As described earlier, the black plane is registered to the paper and then CMY is registered to the black plane. The calibration system can set the right and left margins but the top and bottom margins are adjusted using the calibration page shown in FIG. 5.

Figure 7:
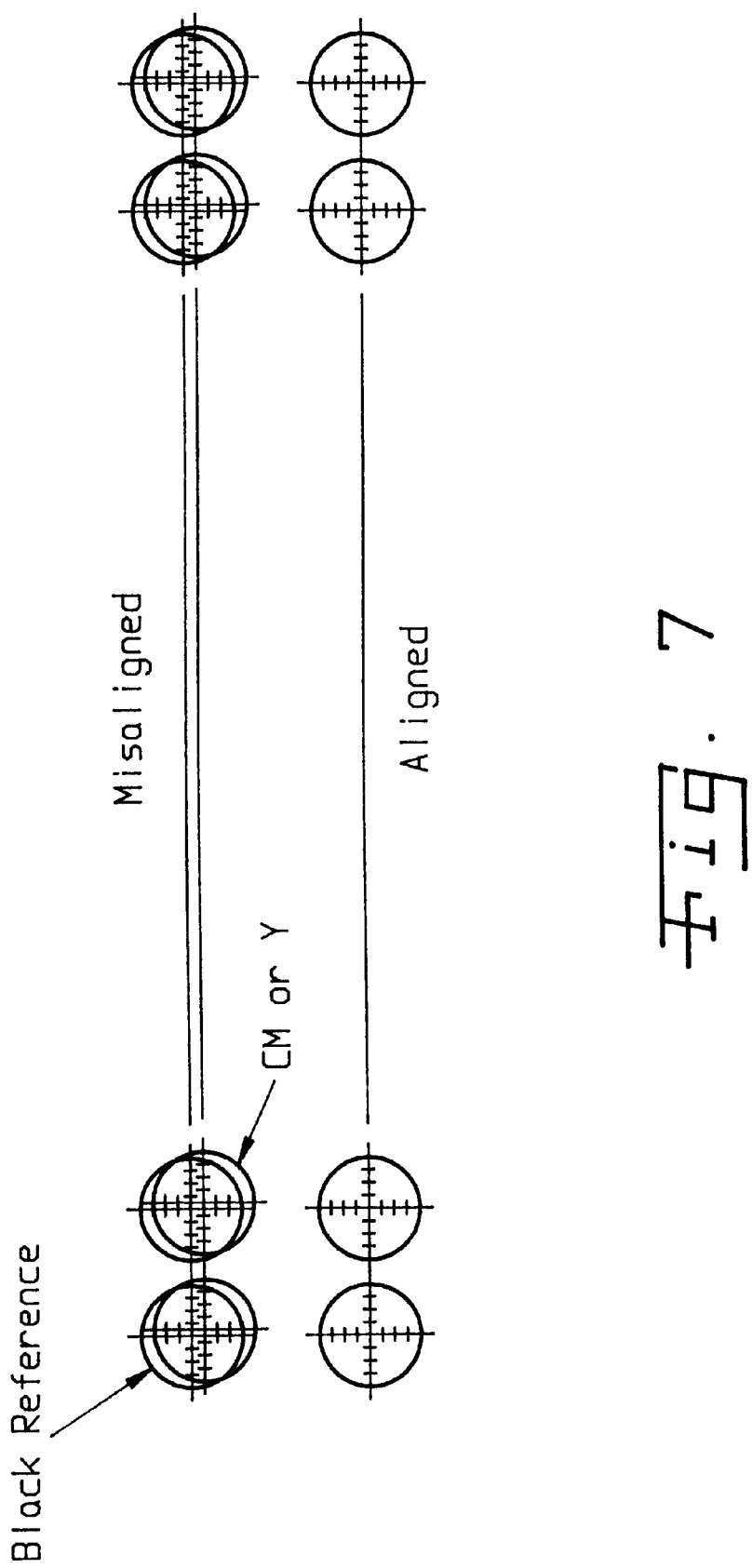
FIG. 7 is a an overhead view of another calibration page with which the color planes can be adjusted to the black plane.

To adjust the CMY to the black plane a different calibration page shown in FIG. 7 is used. This page uses targets to align the top writing line, right margin (first PEL), and the left margin (line length).

The top margin has a coarse adjustment range of +/−127 increments of one 600 dpi scan line per increment and a fine adjustment of +8 increments of ⅛ 600 dpi scan line per increment. The top writing line is adjusted by changing the delay between when the images are started relative to the first plane that is imaged in the tandem process. For reference, the planes are imaged in the following order: yellow, cyan, magenta, and black. The nominal distance between the imaging stations is 101 mm or 2385.8 600 dpi scan lines. Initially the planes are imaged at a nominal delay of 2385 scan lines as shown in FIG. 8. While the calibration system is adjusting the skew of the printheads, the distance between the imaging stations is measured. The difference between the measured distance between the stations and the nominal distance is determined and that value is converted to the number of 600 dpi scan lines. The integer portion is downloaded to the RIP controller to be used as the coarse top margin offset (CTMO) for that respective plane as referenced to black. The fractional portion is converted to the nearest number of ⅛ scan line increments and that value is then downloaded to the RIP controller as the fine top margin offset (FTMO). The calibration system will adjust the CTMO so that the FTMO will always be positive. This adjustment scheme de-couples the black and CMY adjustments so that the adjustments can be executed in any order.

If, for example, the calibration system measures the distance between the black and yellow stations to be 303.5 mm, then the calibration system will determine that the distance is equal to 7169.3 scan lines. The nominal distance of 303 mm requires 7157.5 scan lines. Since the process speed is constant, this increased distance would cause the yellow top line to be late when it arrives at the black transfer point. To get the yellow to arrive on time, the yellow image needs to start earlier by the difference between the number of scan lines for the nominal distance minus the number of scan lines for the measured distance. Also, since the fine adjustment is always positive, if the measured distance is greater than the nominal distance, a count of one should be added to the measured distance. Therefore the CTMO is 7157.5−7170.3 or −12.8 scan lines. The CTMO will be adjusted by −12 and the FTMO will be 0.8 * 8 or 6.

After measuring the top margin, the calibration system then positions the right margin offset (RMO) for the CMY planes. The procedure is similar to the right margin adjustment for the black plane except that the CMY RMO is measured as an error relative to the black plane and therefore is additive to the black plane.

The last adjustment made by the calibration system is the line length or left margin offset (LMO). The CMY line lengths are increased or decreased by inserting PEL slices or removing PEL slices respectively to match the CMY line lengths to the black line length. Since all four mirror motors are operating at the same synchronous speed and the CMY line lengths are measured as an error relative to the black line length, the CMY LMO is additive to the black left margin setting.

There is no adjustment of the bottom margin for colors.

If the margin and plane-to-plane settings need to be modified in the field, then the settings can be modified by putting the printer in a maintenance mode, printing the registration pattern, and following the steps in the procedure that were used in the factory calibration. In the field, however, the service person determines the amount of correction needed by interpreting the printed registration pattern and then entering the correction value by using the front operator panel. This same manual procedure may also be used in the printer manufacturing facility when the calibration tool is not available.

While this invention has been described as having a preferred design, the present invention can be her modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of setting a plurality of margins in an electrophotographic machine, said method comprising the steps of:
   setting a top margin by establishing a first time delay between a vertical synchronization signal and a first line;
   setting one of a right margin and a left margin by establishing a second time delay between a horizontal synchronization signal and a start of printing;
   setting an other of said right margin and said left margin by adjusting a scan speed of a laser beam across a photoconductive element and adjusting a process speed of at least one moving member in a cross-scan direction; and
   setting a bottom margin by adjusting said process speed.

2. The method of claim 1, wherein said at least one moving member comprises at least one of said photoconductive element, an image accumulation member, and a print medium.

3. The method of claim 1, wherein said step of adjusting a scan speed of a laser beam across a photoconductive element includes adjusting a rotational speed of a mirror in a printhead.

4. The method of claim 1, wherein said process speed is in a print medium feed direction.

5. The method of claim 1, wherein said photoconductive element comprises a photoconductive drum.

6. The method of claim 1, wherein said setting of said top margin, right margin and left margin is performed by a raster image processor.

7. The method of claim 1, wherein said one of a right margin and a left margin is dependent upon a printhead calibration process performed after manufacture of said electrophotographic machine.

8. The method of claim 1, wherein said setting of said bottom margin is performed by a print engine.

9. The method of claim 8, wherein the electrophotographic machine comprises a tandem color electrophotographic machine having a plurality of color stations, said print engine adjusting said process speed such that a number of scan lines between at least two of the color stations remains constant.

10. The method of claim 9, wherein said print engine adjusts said process speed by using a lookup table.

11. The method of claim 10, wherein said at least one moving member comprises at least one of said photoconductive element, an image accumulation member, and a print medium.

* * * * *